US008469791B2

(12) United States Patent
Yarbrough et al.

(10) Patent No.: US 8,469,791 B2
(45) Date of Patent: *Jun. 25, 2013

(54) METHOD OF PLAYING A BINGO-TYPE GAME WITH A MECHANICAL TECHNOLOGICAL AID, AND AN APPARATUS AND PROGRAM PRODUCT FOR PLAYING THE GAME

(75) Inventors: Jon P. Yarbrough, Smyrna, TN (US); David L. Wright, Lynchburg, VA (US)

(73) Assignee: Video Gaming Technologies, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/566,724

(22) Filed: Aug. 3, 2012

(65) Prior Publication Data

US 2012/0302313 A1 Nov. 29, 2012

Related U.S. Application Data

(63) Continuation of application No. 13/523,552, filed on Jun. 14, 2012, which is a continuation of application No. 10/797,338, filed on Mar. 10, 2004, now Pat. No. 8,241,103.

(60) Provisional application No. 60/453,460, filed on Mar. 10, 2003.

(51) Int. Cl.
*A63F 13/00* (2006.01)

(52) U.S. Cl.
USPC .................. 463/19; 463/16; 463/17; 463/18; 463/20; 463/21; 463/22; 463/25; 463/46; 273/143 R; 273/269

(58) Field of Classification Search
USPC .......... 463/12-13, 16-22, 25-27, 29, 40-42, 463/7-9, 46; 273/143, 269
See application file for complete search history.

(56) References Cited

U.S. PATENT DOCUMENTS 5,072,381 A 12/1991 Richardson et al.
5,265,880 A 11/1993 Maksymec
5,393,057 A 2/1995 Marnell, II
5,518,253 A 5/1996 Pocock et al.
5,569,083 A 10/1996 Fioretti
5,647,798 A 7/1997 Falciglia
5,657,991 A 8/1997 Camarato
5,935,002 A * 8/1999 Falciglia ........................ 463/19
6,220,596 B1 4/2001 Horan
6,302,790 B1 10/2001 Brossard (Continued)

*Primary Examiner* — Sunit Pandya
(74) *Attorney, Agent, or Firm* — Howard & Howard Attorneys PLLC

(57) ABSTRACT

A method of playing a bingo-type game includes the steps of generating a result of the game and displaying a representation of the result. More specifically, the representation of the result of the game is displayed through a mechanical technological aid at an electronic play station. An apparatus for playing the game includes a server and the electronic play station in operative communication with the server. The server generates the called numbers, which correlate to the result of the game, and the electronic play station includes the mechanical technological aid for displaying the representation of the result of the game. A program product for playing the game is stored on computer readable media and includes a result program code for generating the result of the game and a display program code for displaying the representation of the result through the mechanical technological aid.

51 Claims, 6 Drawing Sheets

U.S. PATENT DOCUMENTS

| | | | |
|---|---|---|---|
| 6,309,300 | B1 | 10/2001 | Glavich |
| 6,322,309 | B1 | 11/2001 | Thomas et al. |
| 6,338,678 | B1 | 1/2002 | Seelig et al. |
| 6,398,645 | B1 * | 6/2002 | Yoseloff .......................... 463/19 |
| 6,569,017 | B2 | 5/2003 | Enzminger et al. |
| 6,581,935 | B1 | 6/2003 | Odom |
| 6,743,102 | B1 | 6/2004 | Fiechter et al. |
| 6,840,858 | B2 | 1/2005 | Adams |
| 6,875,106 | B2 | 4/2005 | Weiss et al. |
| 6,902,479 | B1 | 6/2005 | D'Avanzo |
| 6,984,173 | B1 | 1/2006 | Piechowiak et al. |
| 2002/0045472 | A1 | 4/2002 | Adams |
| 2002/0065126 | A1 | 5/2002 | Miller et al. |
| 2002/0111207 | A1 | 8/2002 | Lind et al. |
| 2002/0113369 | A1 | 8/2002 | Weingardt |
| 2002/0132661 | A1 | 9/2002 | Lind et al. |
| 2002/0160829 | A1 | 10/2002 | Webb et al. |
| 2002/0198044 | A1 | 12/2002 | Walker et al. |
| 2003/0001338 | A1 | 1/2003 | Bennett et al. |
| 2003/0017865 | A1 | 1/2003 | Beaulieu et al. |
| 2004/0130096 | A1 | 7/2004 | Duhamel |
| 2004/0137985 | A1 | 7/2004 | Sprudzans et al. |
| 2004/0176169 | A1 | 9/2004 | Lind et al. |
| 2004/0248642 | A1 | 12/2004 | Rothschild |
| 2004/0259627 | A1 | 12/2004 | Walker et al. |
| 2005/0059467 | A1 | 3/2005 | Saffari et al. |
| 2005/0164771 | A1 | 7/2005 | Lind et al. |
| 2005/0208991 | A1 | 9/2005 | Luciano, Jr. et al. |
| 2005/0233798 | A1 | 10/2005 | Van Asdale |

* cited by examiner

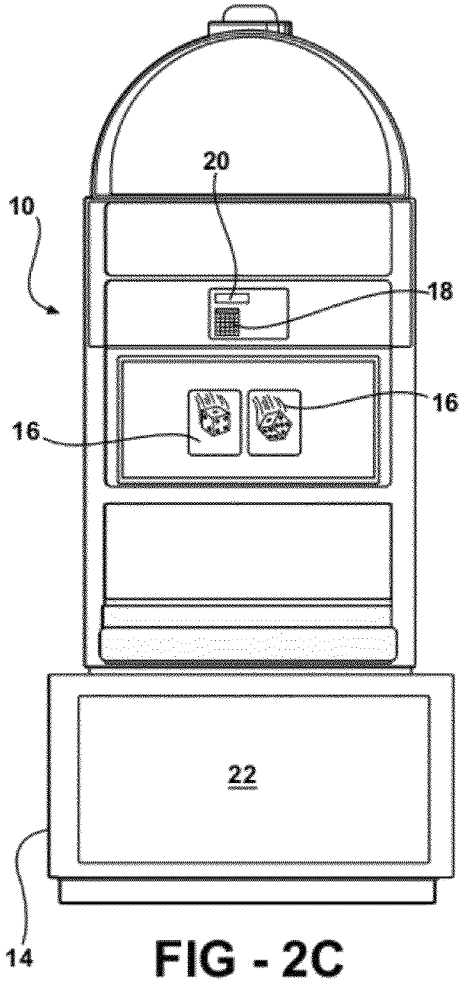
FIG - 2C
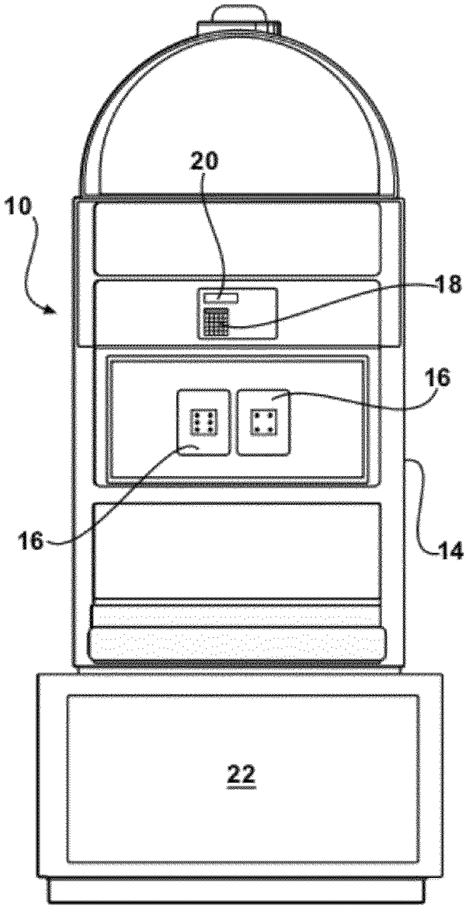
FIG - 2D
FIG - 3
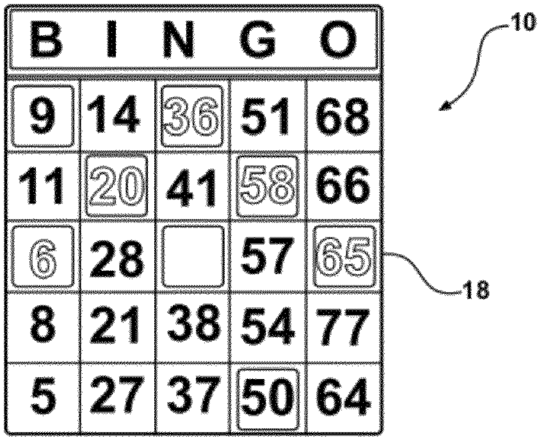

METHOD OF PLAYING A BINGO-TYPE GAME WITH A MECHANICAL TECHNOLOGICAL AID, AND AN APPARATUS AND PROGRAM PRODUCT FOR PLAYING THE GAME

CROSS REFERENCE TO RELATED APPLICATION

This application is a continuation of U.S. patent application Ser. No. 13/523,552, filed Jun. 14, 2012, and U.S. patent application Ser. No. 10/797,338, filed Mar. 10, 2004, which claims priority to U.S. Provisional Patent Application 60/453,460, filed on Mar. 10, 2003, the disclosures of which are hereby incorporated by reference in their entirety.

FIELD OF THE INVENTION

The subject invention generally relates to a method of playing a bingo-type game. The subject invention also generally relates to an apparatus and a program product for playing the bingo-type game. More specifically, the subject invention relates to a method, apparatus, and program product that use a mechanical technological aid to display a representation of a result of the bingo-type game.

BACKGROUND OF THE INVENTION

Bingo-type games are known in the art. For example, as is known, a traditional bingo game is played with bingo cards, which typically have a 5×5 grid. More specifically, this grid includes 5 columns and 5 rows, and the letters, "B," "I," "N," "G," and "O" are at the top of each column. Under each letter are five numbers, with the exception of the center space which is typically a free space. Therefore, there are typically 24 numbers. The numbers on the each bingo card are randomly established so that each bingo card is unique. The bingo cards further include a predetermined pattern or patterns, which are typically represented by a darkened segment in the traditional bingo game. Numbers are called, e.g. "I-20", and players of the game daub, or otherwise, mark-off the number if they have it. Once a player achieves the predetermined pattern or patterns, and the player actually recognizes this achievement, he or she wins and the game is over.

Other bingo-type games include modern variations of the traditional bingo-type game. Some of these modern variations are played in a casino or gaming hall at a client, i.e., terminal. The client is also referred to as an electronic play station. These modern variations have various attractions and designs, including aesthetic symbols and both audio and visual animations, to attract players thereby increasing a level of play. As alluded to above, these modern variations are bingo-type games. However, there is a recognition throughout industry that players of even the modern bingo-type games do not consider these games as exciting and attractive as standard slot machines. Simply stated, the bingo-type games do not look and operate like standard slot machines. For this reason, the bingo-type games of the prior art do not peak the interest of a patron of the casino or gaming hall. This impacts the level of play as compared to that of the standard slot machines and is, therefore, undesirable to both the industry and players.

To this end, there have been efforts to maintain a bingo-type game yet still create the 'appearance' of a standard slot machine to a player of the bingo-type game. These efforts have, more specifically, focused on displaying a representation of a result of the bingo-type game, i.e., whether a player has won or lost, through a technological aid at the electronic play station. Therefore, although the player is playing the bingo-type game, and any payouts to the player are based on this bingo-type game, the player pays particular attention to what the technological aid reveals, i.e., the player pays particular attention the representation of the result. However, to date, the technological aids have been limited to video-based technological aids. Examples of video-based technological aids are disclosed in United States Publication No. US 2002/0132661 A1 to Lind et al. The video-based technological aids of Lind et al. are disposed on a video screen where the bingo-type game (including the bingo card and the called numbers) is also displayed and not separate from this video screen (see, for example, FIG. 1, labeled "Prior Art"). For this reason, these technological aids are particularly cumbersome. Simply stated, the spinning reels, playing cards, roulette wheel, die, keno board, and horse race of Lind et al. are limited to video-based technological aids.

It is recognized throughout the industry that video-based technological aids are deficient for a variety of reasons. One of the most important reasons is that the typical casino or gaming hall patron prefers devices that are perceived to be mechanical-based devices as compared to devices that are perceived to be video-based devices, such as video-based technological aids. For instance, when give the option between a standard video-based slot machine, i.e., a slot machine where the reels are on a video screen, and a standard mechanical-based slot machine, i.e., a slot machine where the reels are on a mechanical drum or drums, more players than not will opt to play the mechanical-based slot machine. For obvious reasons, this preference would be detrimental to a level of play of a bingo-type game that uses a video-based technological aid as compared to a bingo-type game that would use a mechanical-based device, such as a mechanical technological aid.

Due to the deficiencies with the bingo-type games of the prior art, especially the efforts focused on video-based technological aids, it is desirable to provide a new and unique bingo-type game that creates the perception of a mechanical-based slot machine such that the interest of the patrons can be peaked and the level of play can be maximized.

SUMMARY OF INVENTION AND ADVANTAGES

A method of playing a bingo-type game is provided. The method includes the step of generating a result of the bingo-type game, and displaying a representation of the result. The representation of the result is, more specifically, displayed through a mechanical technological aid at an electronic play station.

An apparatus and a program product for playing the bingo-type game are also provided. The apparatus includes a server and the electronic play station. The server generates at least one called number, which correlates to the result of the bingo-type game. The electronic play station, which is in operative communication with the server, includes the mechanical technological aid. As such, the electronic play station, through the mechanical technological aid, is able to display the representation of the result of the bingo-type game. The program product, which is stored on computer readable media, includes a result program code and a display program code. The result program code generates the result of the bingo-type game, and the display program code displays the representation of the result through the mechanical technological aid at the electronic play station.

The mechanical technological aid functions to assist a patron of a casino or gaming hall, or a player who is actively playing the bingo-type game, in identifying, i.e., realizing, whether they have won or lost the bingo-type game. The individual can simply look to and rely on the mechanical technological aid to evaluate what is actually going on in the bingo-type game. Advantageously, the individual does not have to rely on interpreting the result from a bingo card which, as is known, can be cumbersome. Furthermore, the mechanical technological aid on the bingo-type game creates the perception of a standard mechanical-based slot machine, or more generally the perception of a gaming apparatus that relies on mechanically-based devices rather than on video-based devices. All of the above advantages add to the excitement of the bingo-type game of the present invention and increase a level of play associated with this bingo-type game.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2C is a front view of the electronic play station of FIG. 2A where the mechanical technological aid includes one or more mechanical die during mechanical rolling;

FIG. 2D is a front view of the bingo-type game of FIG. 2C where the one or more mechanical die are at rest to display a representation of a result of the bingo-type game;

FIG. 3 is a schematic view illustrating a bingo card from the video screen;

DETAILED DESCRIPTION OF THE INVENTION

Referring to the Figures, wherein like numerals indicate like or corresponding part throughout the several views, a bingo-type game is generally shown at 10. As described additionally throughout, the bingo-type game 10 of the present invention is played with an apparatus, generally disclosed, but not numbered, in the Figures.

The apparatus includes a server 12, also referred to as a back-office component, and an electronic play station (EPS) 14. The EPS 14 is in operative communication with the server 12 and includes a mechanical technological aid 16 as described below. Although not required, it is preferred that the server 12 and the EPS 14 communicate via an Ethernet network. Furthermore, the server 12 can be local or remote relative to the EPS 14. The location of the server 12 is not critical to the focus of the present invention. The server 12, primarily the function of the server 12, and the EPS 14 are described additionally below.

Generally, the method includes generating a result of the bingo-type game 10 and displaying a representation of the result of the bingo-type game 10. More specifically, the representation of the result of the bingo-type game 10 is displayed, at the EPS 14, through the mechanical technological aid 16. Importantly, a determination of whether a plurality of players, i.e., two or more players, are playing the bingo-type game 10 is necessary prior to generating the result of the bingo-type game 10. Thus, it is preferred that there is more than one EPS 14 and that they are operatively interconnected. The EPSs 14 may even be in different casinos and/or gaming halls and/or different states and/or countries.

A program product for playing the bingo-type game 10, which is stored on computer readable media, follows this general method and includes a result program code and a display program code. The result program code of the program product generates the a result of the bingo-type game 10 whereas the display program code of the program product displays the representation of the result through the mechanical technological aid 16 at the EPS 14. Other program codes may be included in the program product to accomplish the method of the present invention.

Figure 1:
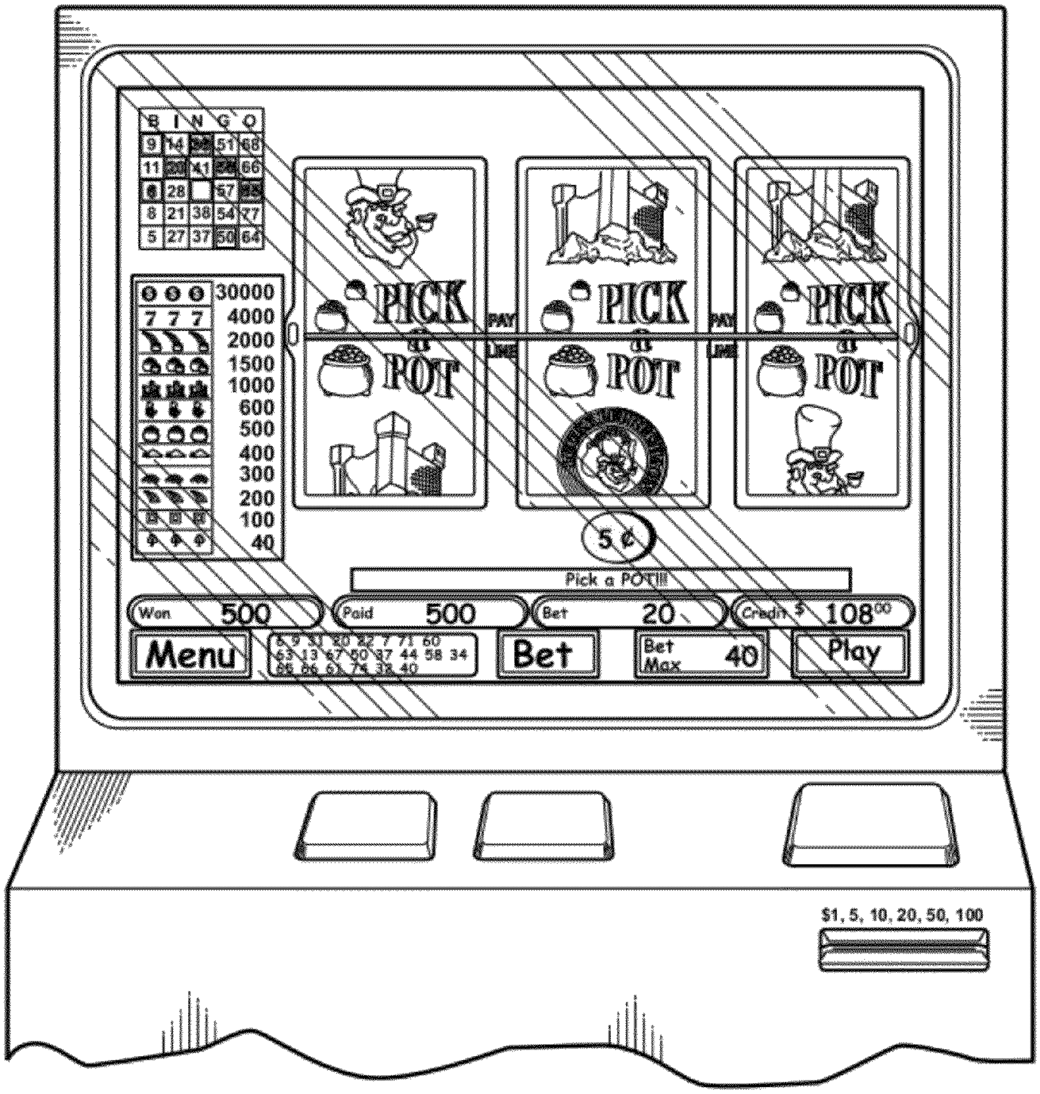
FIG - 1 PRIOR ART
FIG. 1 is a front view of a prior art bingo-type game illustrating, in particular, a bingo card, called numbers, and video spinning reels, all displayed on a single video screen.
Figure 2A:
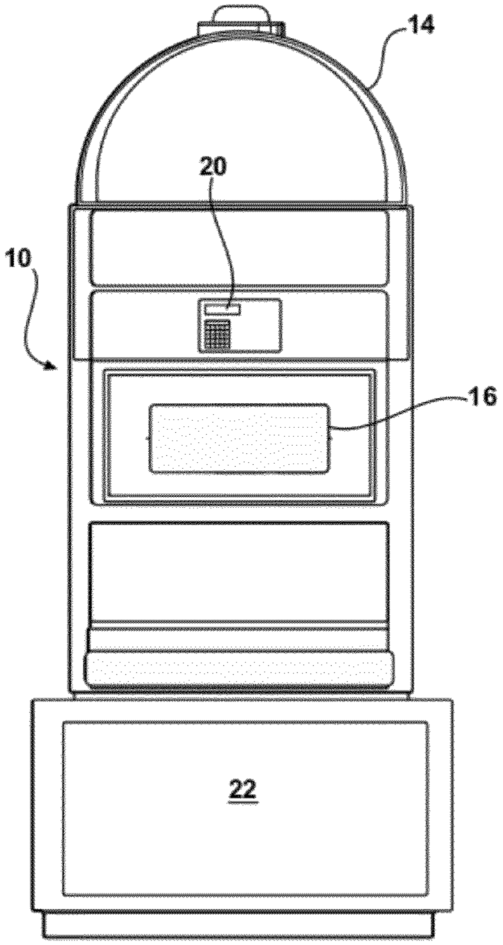
FIG. 2A is a front view of a electronic play station for playing the bingo-type game including a mechanical technological aid according to the present invention illustrating, in particular, the bingo-type game displayed on a video screen and the mechanical technological aid separate from the video screen.
Figure 2B:
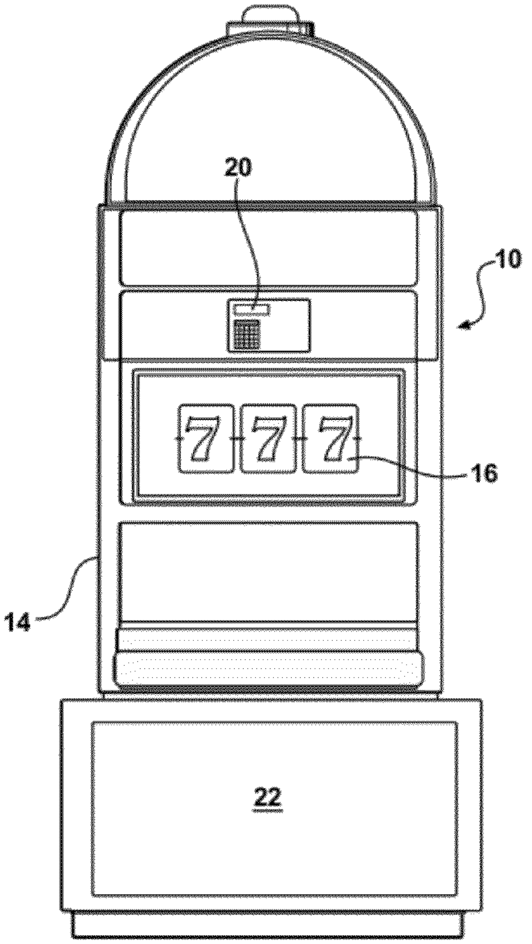
FIG. 2B is a front view of the electronic play station of FIG. 2A where the mechanical technological aid includes one or more mechanical spinning reel.
Figure 4:
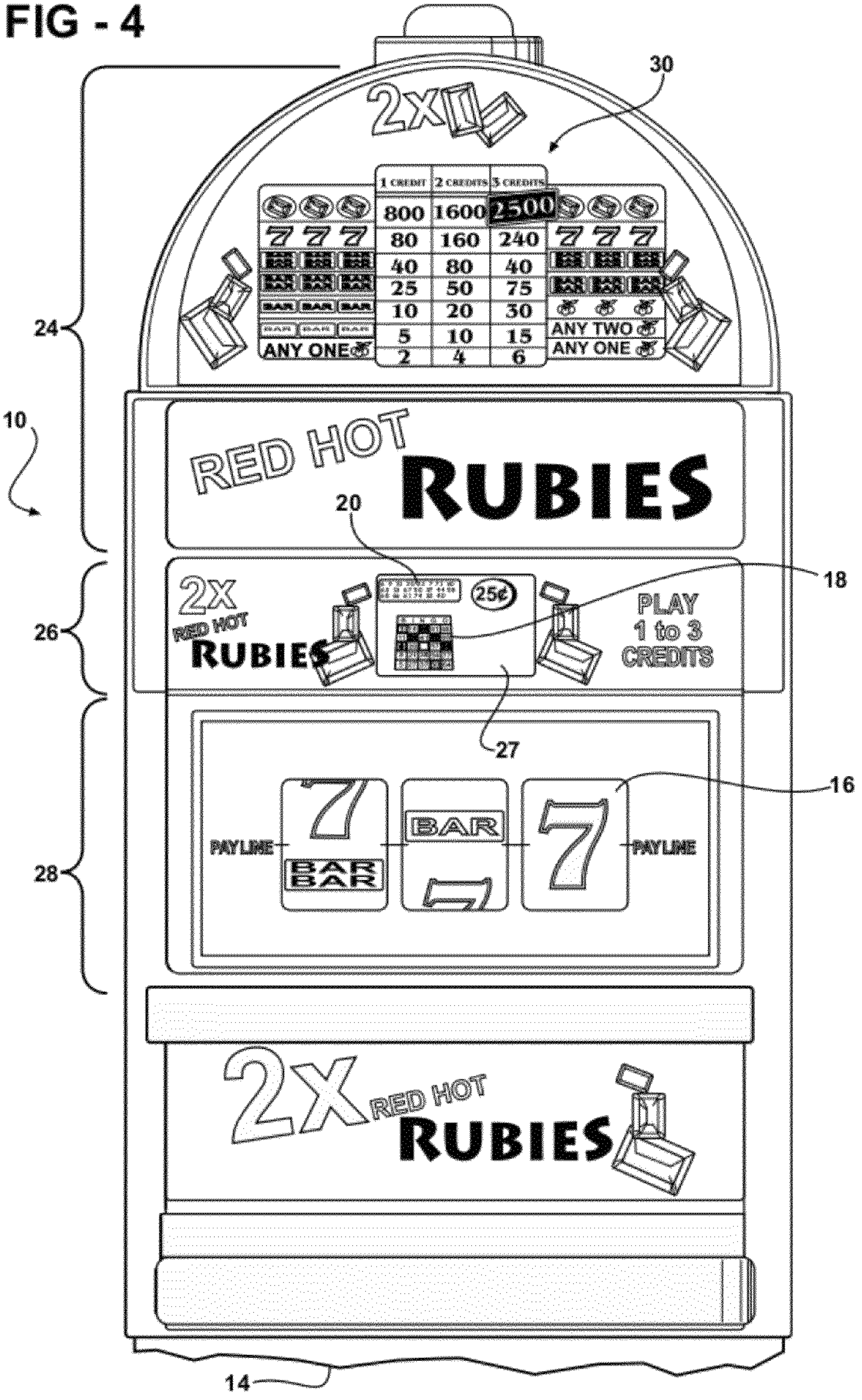
FIG. 4 is an enlarged front view of an electronic play station including the video screen for the bingo-type game and the mechanical technological aid separate from the video screen.

Referring specifically to FIG. 2A where the mechanical technological aid 16 is generically represented, it is to be understood that the mechanical technological aid 16 can be an mechanical-based device suitable for displaying the representation of the result of the bingo-type game 10. Preferably, the mechanical technological aid 16 includes one or more mechanical spinning reels. If there is more than one mechanical spinning reel (which typically rotate about a single axis), the reels can be associated with a unitary drum or discrete drums. Other mechanical technological aids 16 suitable for use in the present invention include, but are not limited to, one or more mechanical spinning wheels, one or more mechanical dies, one or more mechanical playing card, and combinations thereof. Referring to FIGS. 2C and 2D, two die (which rotate about more than one axis) are illustrated. This is not required. That is, one die, three die, etc. may be used in place of the two die.

The method more specifically includes the steps of creating a bingo card 18 (refer to FIG. 3) and generating at least one called number 20. These steps occur in response a player beginning play of the bingo-type game 10. To accomplish this, the player inserts money into the bingo-type game 10, preferably into a currency validator. The particular component of the apparatus that creates the bingo card 18 is not critical. It is preferred that the EPS 14 includes a controller 22 for creating the bingo card 18. However, it is to be understood that the server 12 can create the bingo card 18 and can communicate the created bingo card 18 to the EPS 14 as necessary. On the other hand, it is the server 12 that generates the at least one called number 20 that correlates to the result of the bingo-type game 10. Preferably, the at least one called number 20 is generated randomly from a superset of numbers stored in the server 12.

Although, in theory, the bingo-type game 10 can proceed with a single called number 20, it is obviously more practical and preferred that a plurality of called numbers 20 are generated. Thus, the remainder of the invention will be described only in terms of this plurality 20 as opposed to the single called number 20. This is not to be interpreted as limiting. Depending on the particular form of the bingo-type game 10, the called numbers 20 can be generated at the same time, or the called numbers 20 can be generated in succession. This latter form, where the called numbers 20 are generated in succession, is preferred and is referred to as "Live-Call" bingo.

Another form of the bingo-type game 10 is known in the art as "Bonanza" or "Instant" bingo and this form of the bingo-type game falls within the scope of the present invention. It is known that in such forms, the called numbers 20 are generated first and then the bingo card 18 is created, and the bingo card 18 is matched to the called numbers 20.

Once the bingo card 18 is created and the called numbers 20 have been generated, the called numbers 20 are reported to the EPS 14 for comparison to the bingo card 18. The called numbers 20 are then compared to the bingo card 18 to determine whether the called numbers 20 establish a game-ending pattern, an interim pattern, or both patterns on the bingo card 18. In terms of components, the responsibility for the necessary comparison to determine whether the called numbers 20 establish a pattern can lie with the server 12, the EPS 14, or both the server 12 and the EPS 14. As is understood by those skilled in the art, the game-ending pattern and the interim pattern can vary.

Figure 5A:
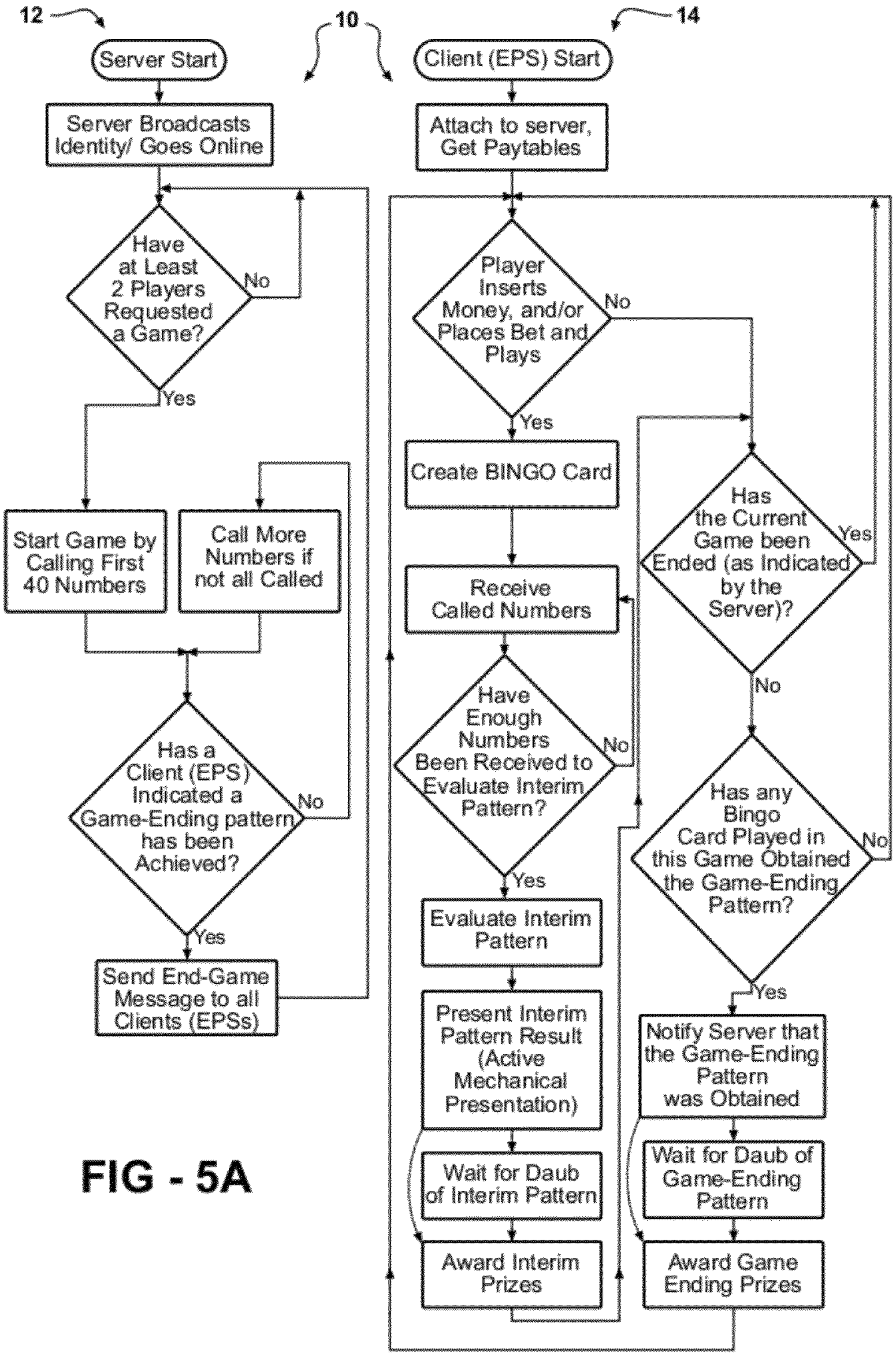
FIG. 5A is a general flow chart illustrating both server and client (electronic play station) communication where the bingo-type game is initiated by calling for 40 called numbers.
Figure 5B:
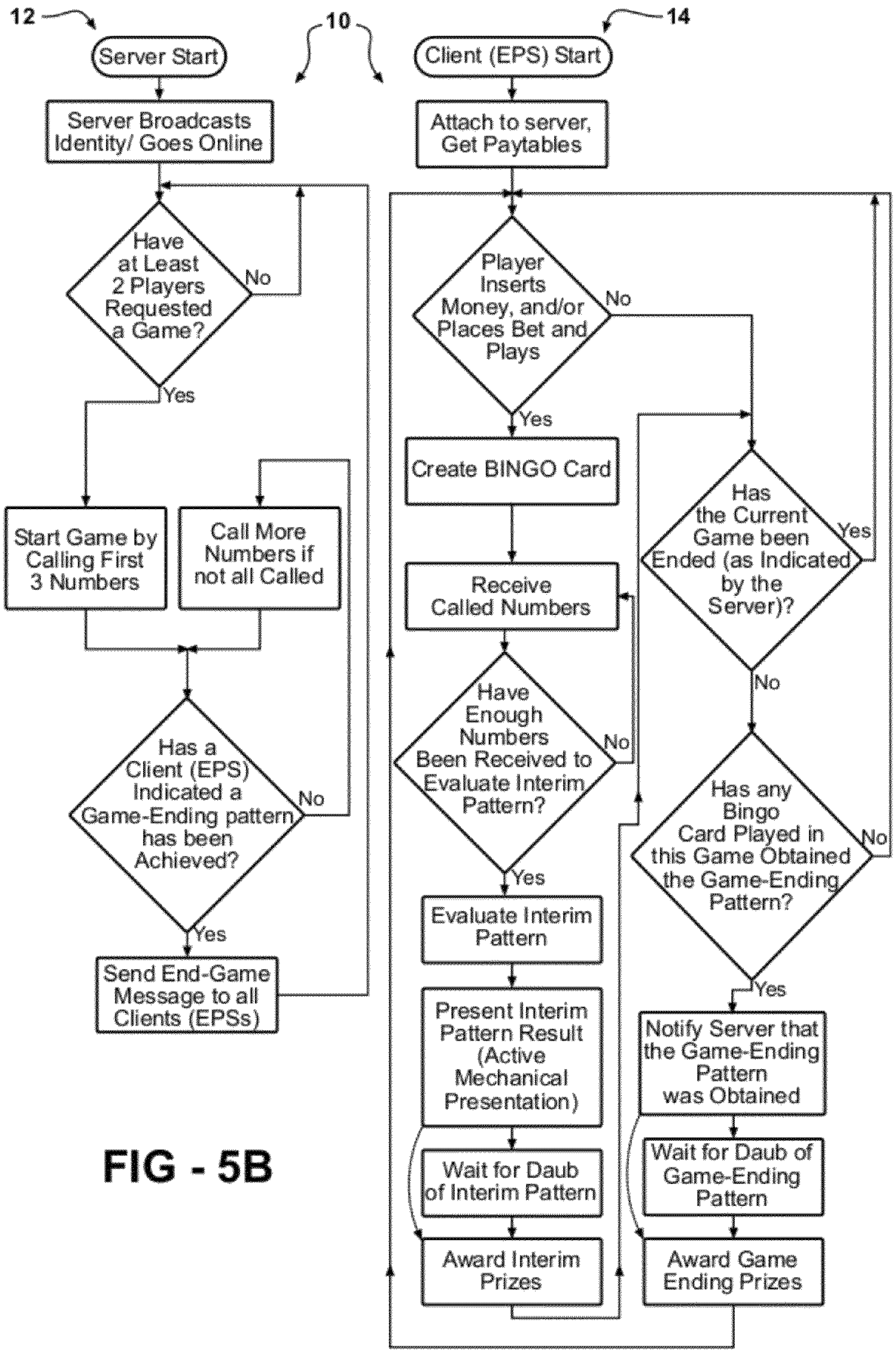
FIG. 5B is a general flow chart illustrating both server and client (electronic play station) communication where the bingo-type game is initiated by calling for 3 called numbers.

With more specific reference to FIGS. 5A and 5B and certain game-ending scenarios, the step of generating the result of the bingo-type game 10 includes the step of determining whether the called numbers 20 establish the game-ending pattern on the bingo card 18. If it is determined that the called numbers 20 do establish the game-ending pattern on the bingo card 18, the representation of this result through the mechanical technological aid 16 will be displayed at the EPS 14 in response to this determination.

More specifically, the controller 22 of the EPS 14 is in operative communication with the mechanical technological aid 16 and activates the mechanical technological aid 16 to display the representation of the result. If the game-ending pattern has been achieved, the representation of the result on the mechanical technological aid 16 will be favorable, i.e., symbols of mechanical spinning reels will align across a pay line, depending on the pay table 30. If the game-ending pattern has not been achieved, the representation of the result on the mechanical technological aid 16 will be unfavorable, i.e., the symbols of the mechanical spinning reels will not align across the pay line.

Next, a game-ending prize is awarded i.e. paid, also in response to this determination (and assuming the game-ending pattern has been achieved). This game-ending prize can be automatically awarded. However, it is preferred to require the player to daub of the game-ending pattern prior to awarding the game-ending prize. Alternatively, an auto-daubing option can be provided prior to awarding the game-ending prize. In this scenario, the player can exercise this auto-daubing option and then be awarded the game-ending prize. Finally, if it is determined that a game-ending pattern has been established, then the bingo-type game 10 is ended in response to this determination.

On the other hand, independent of the game-ending pattern, a determination is preferably made as to whether the called numbers 20 establish the interim pattern on the bingo card 18. If it is determined that the called numbers 20 do establish the interim pattern (or one of many different interim patterns) on the bingo card 18, the representation of this result through the mechanical technological aid 16 will be displayed at the EPS 14 in response to this determination.

Similar to that described above, a prize, specifically an interim prize, is awarded in response to determining whether the interim pattern has been established on the bingo card 18, assuming that the interim pattern has been established. The daubing and auto-daubing options are also applicable relative to the interim pattern and interim prize.

The controller 22 of the EPS 14 also operatively communicates with and activates the mechanical technological aid 16, as necessary, to display the representation of the result relative to the interim pattern and interim prize.

Referring primarily to FIGS. 2A-2D and 4, the EPS 14 generally includes three sections, specifically a menu section 24, a video display section 26, and mechanical display section 28. The menu section 24 of the EPS 14 includes the pay table 30 which varies depending on a particular number of credits that a player of the bingo-type game 10 desires. The bingo card 18 and the called numbers 20 are displayed on the video display section 26 of the EPS 14 and the mechanical technological aid 16 is disposed within the mechanical display section 28. More specifically, the video display section 26 of the EPS 14 includes a video screen (or monitor) 27 where the bingo card 18 and the called numbers 20 are displayed.

The mechanical technological aid 16, which is preferably one or more mechanical spinning reels, functions as an aid to assist the players in realizing when they have won or lost the bingo-type game 10. Therefore, the players can look to the mechanical technological aid 16 to determine if they have won or lost. The players do not have to rely on interpreting the bingo card 18, which can be cumbersome. The bingo-type game 10 of the present invention improves the interest of the players and adds excitement to the bingo game. It is important to recognize that the displaying of the representation of the result through the technological aid is not a secondary, or bonus, game that is played in conjunction with the bingo-type game 10. The representation on the mechanical technological aid 16 is not a separate game. Instead, it is only indicative of the results of the bingo-type game 10.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A game system for playing an electronic bingo game, comprising:

a player game device for allowing a player to place a wager, the player game device including a user interface and a mechanical device; and, a game controller coupled to the player game device for playing the electronic bingo game and establishing a result of the electronic bingo game, the result of the electronic game including an award if a set of predetermined winning conditions has been achieved, wherein an award representation of the result is directly displayed upon and represented by the mechanical device at the player game device.

2. A system, as set forth in claim 1, wherein the result includes a matching condition of an interim pattern on a bingo card.

3. A system, as set forth in claim 1, wherein the result includes a matching condition of a game ending pattern on a bingo card.

4. A system, as set forth in claim 1, the game controller for creating a first bingo card for a first player and a second bingo card for a second player that is different than the first bingo card and prior to generating the result of the bingo game.

5. A system, as set forth in claim 4, the game controller for generating at least one called number shared in common by the first and second players prior to generating the result of the bingo game.

6. A system, as set forth in claim 5, the game controller for comparing the at least one called number to the first and second bingo cards after the at least one called number has been generated.

7. A system, as set forth in claim 5, the game controller for determining whether the at least one called number establishes a pattern on any one of the first and second bingo cards.

8. A system, as set forth in claim 7, wherein the game controller displays the award representation of the result is in response to determining whether the pattern has been established on any one of the bingo cards.

9. A system, as set forth in claim 8, the game controller awards the award in response to determining whether the pattern has been established on any one of the bingo cards.

10. A system, as set forth in claim 8, the game controller for ending the bingo game in response to determining whether a game-ending pattern has been established on any one of the bingo cards.

11. A system, as set forth in claim 5, wherein the result is an end game result, the game controller for determining whether the called numbers establish a game-ending pattern on any one of the bingo cards.

12. A system, as set forth in claim 5, the game controller for determining whether the called numbers establish an interim pattern on any one of the bingo cards.

13. A system, as set forth in claim 12, wherein an interim award representation of an interim game result is directly displayed upon and represented by the mechanical technological aid in response to determining whether the interim pattern has been established on any one of the bingo cards.

14. A system, as set forth in claim 13, the game controller for awarding an interim award in response to determining whether the interim pattern has been established on any one of the bingo cards.

15. A system, as set forth in claim 1, wherein the player game device is configured to generate a bingo card for the player prior to generating the result of the bingo game.

16. A method for playing an electronic bingo game, comprising:

allowing a player to place a wager at a player game device;

playing, by a game controller coupled to the player game device, the electronic bingo game and establishing a result of the electronic bingo game, the result of the electronic game including an award if a set of predetermined winning conditions has been achieved; and directly displaying an award representation of the result upon and represented by a mechanical device at the player game device.

17. A method, as set forth in claim 16, wherein the result includes a matching condition of an interim pattern on a bingo card.

18. A method, as set forth in claim 16, wherein the result includes a matching condition of a game ending pattern on a bingo card.

19. A method, as set forth in claim 16, further comprising the step of creating a first bingo card for a first player and a second bingo card for a second player that is different than the first bingo card and prior to the step of generating the result of the bingo game.

20. A method, as set forth in claim 19, further comprising the step of generating at least one called number shared in common by the first and second players prior to the step of generating the result of the bingo game.

21. A method, as set forth in claim 20, further comprising the step of comparing the at least one called number to the first and second bingo cards after the at least one called number has been generated.

22. A method, as set forth in claim 20, wherein the step of generating the result of the bingo game further comprises the step of determining whether the at least one called number establishes a pattern on any one of the first and second bingo cards.

23. A method, as set forth in claim 22, wherein the step of displaying the award representation of the result is in response to determining whether the pattern has been established on any one of the bingo cards.

24. A method, as set forth in claim 23, further comprising the step of awarding a prize in response to determining whether the pattern has been established on any one of the bingo cards.

25. A method, as set forth in claim 23, further comprising the step of ending the bingo game in response to determining whether a game-ending pattern has been established on any one of the bingo cards.

26. A method, as set forth in claim 20, wherein the result is an end game result and the step of generating the end game result of the bingo game further comprises the step of determining whether the called numbers establish a game-ending pattern on any one of the bingo cards.

27. A method, as set forth in claim 20, wherein the step of generating the result of the bingo game further comprises the step of determining whether the called numbers establish an interim pattern on any one of the bingo cards.

28. A method, as set forth in claim 27, comprising the further step of displaying an interim award representation of an interim game result directly displayed upon and represented by the mechanical technological aid in response to determining whether the interim pattern has been established on any one of the bingo cards.

29. A method, as set forth in claim 28, further comprising the step of awarding an interim prize in response to determining whether the interim pattern has been established on any one of the bingo cards.

30. A game system for playing an electronic bingo game, comprising:

a player game device for allowing a player to place a wager, the player game device including a user interface and at least one mechanical spinning reel; and, a game controller coupled to the player game device for playing the electronic bingo game and establishing a result of the electronic bingo game, the result of the electronic game including an award if a set of predetermined winning conditions has been achieved, wherein an award representation of the result is directly displayed through a simulated game using the at least one mechanical spinning reel.

31. A system, as set forth in claim 30, wherein the simulated game is a slot game.

32. A method for playing an electronic bingo game, comprising:

allowing a player to place a wager at a player game device;

playing, by a game controller coupled to the player game device, the electronic bingo game and establishing a result of the electronic bingo game, the result of the electronic game including an award if a set of predetermined winning conditions has been achieved; and directly displaying an award representation of the result through a simulated game using at least one mechanical spinning reel at the player game device.

33. A method, as set forth in claim 32, wherein the simulated game is a slot game.

34. A method of playing an electronic bingo game, comprising:

providing a player game device;

creating a bingo card;

allowing a player to make a wager at the player game device;

receiving at least one called number at the player game device;

determining whether the at least one called number establishes at least one of a game-ending pattern or an interim pattern on the bingo card;

generating a result of the bingo game correlating to the determination of whether the at least one called number establishes at least one of the patterns; and, directly displaying an award representation of the result upon and represented by a mechanical device at the player game device and responsively awarding the player an award.

35. A method, as set forth in claim 34, further comprising the steps of:

receiving at the player game device a current game ending signal;

determining if the bingo card has obtained a game ending pattern, and if so, sending a signal to a server that the game ending pattern has been obtained; and, awarding a game ending prize.

36. A game system, as set forth in claim 1, further comprising a server coupled to the player game device, the server configured to create a bingo card for use in the electronic bingo game.

37. A game system, as set forth in claim 1, wherein the game controller is embodied in a server.

38. A game system, as set forth in claim 1, wherein the game controller is located at the player game device.

39. A game system, as set forth in claim 30, further comprising a server coupled to the player game device, the server configured to create a bingo card for use in the electronic bingo game.

40. A game system, as set forth in claim 30, wherein the game controller is embodied in a server.

41. A game system, as set forth in claim 30, wherein the game controller is located at the player game device.

42. A method, as set forth in claim 16, further comprising the step creating a bingo card for use in the electronic bingo game.

43. A method, as set forth in claim 42, wherein the step of creating a bingo card is performed at a server coupled to the player game device.

44. A method, as set forth in claim 16, wherein the game controller is embodied in a server.

45. A method, as set forth in claim 16, wherein the game controller is located at the player game device.

46. A method, as set forth in claim 32, further comprising the step creating a bingo card for use in the electronic bingo game.

47. A method, as set forth in claim 46, wherein the step of creating a bingo card is performed at a server coupled to the player game device.

48. A method, as set forth in claim 32, wherein the game controller is embodied in a server.

49. A method, as set forth in claim 32, wherein the game controller is located at the player game device.

50. A method, as set forth in claim 34, wherein the step of creating a bingo card is performed at a server coupled to the player game device.

51. A method, as set forth in claim 34, wherein the step of creating a bingo card is performed at the player game device.

* * * * *